US008732661B2

(12) United States Patent
Brown et al.

(10) Patent No.: US 8,732,661 B2
(45) Date of Patent: May 20, 2014

(54) USER EXPERIENCE CUSTOMIZATION FRAMEWORK

(75) Inventors: Allan Thompson Brown, Snohomish, WA (US); Gilma Annuska Zolyomi Perkins, Redmond, WA (US); Ignacio Faus Catasus, Bellevue, WA (US); Richard Wayne Demar, Seattle, WA (US); Bjorn Rettig, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1809 days.

(21) Appl. No.: 11/701,142

(22) Filed: Feb. 1, 2007

(65) Prior Publication Data

US 2008/0189680 A1 Aug. 7, 2008

(51) Int. Cl.
*G06F 9/44* (2006.01)
*G06F 9/45* (2006.01)
*G06F 3/00* (2006.01)

(52) U.S. Cl.
USPC ........... 717/120; 717/116; 717/137; 717/163; 719/328; 719/330

(58) Field of Classification Search
None
See application file for complete search history.

(56) References Cited

U.S. PATENT DOCUMENTS

| | | | |
|---|---|---|---|
| 5,179,700 A | | 1/1993 | Aihara et al. |
| 5,956,029 A | | 9/1999 | Okada et al. |
| 6,052,676 A | | 4/2000 | Hekmatpour |
| 6,292,186 B1 | | 9/2001 | Lehman et al. |
| 6,476,833 B1 * | 11/2002 | Moshfeghi | .................... 715/854 |
| 6,650,889 B1 * | 11/2003 | Evans et al. | ................. 455/412.1 |
| 6,711,740 B1 * | 3/2004 | Moon et al. | .................... 719/328 |
| 6,823,508 B1 * | 11/2004 | Burkhardt et al. | ............ 717/174 |
| 6,901,585 B2 | 5/2005 | Dutta et al. | |
| 6,934,697 B1 * | 8/2005 | Warren | ................................ 1/1 |
| 7,191,186 B1 * | 3/2007 | Pullen | .................................. 1/1 |
| 7,284,240 B1 * | 10/2007 | Fleegal | ......................... 717/137 |
| 7,516,460 B2 * | 4/2009 | Ramani | ......................... 719/331 |
| 7,543,286 B2 * | 6/2009 | Relyea et al. | ................. 717/162 |
| 7,603,658 B2 * | 10/2009 | Subramanian et al. | ........ 717/126 |
| 7,681,118 B1 * | 3/2010 | Dasari et al. | ................... 715/234 |
| 7,962,925 B2 * | 6/2011 | Fry et al. | ....................... 719/328 |
| 7,996,855 B2 * | 8/2011 | Heist et al. | ..................... 719/330 |
| 8,397,223 B2 * | 3/2013 | Chiang | .......................... 717/145 |
| 2002/0097264 A1 | 7/2002 | Dutta et al. | |

(Continued)

OTHER PUBLICATIONS

Adrienne Felt et al., "Privacy Protection for Social Networking APIs", [Online], 2008, pp. 1-8, [Retrieved from Internet on Dec. 19, 2013], <http://www.cs.virginia.edu/felt/privacybyproxy.pdf>.*

(Continued)

*Primary Examiner* — Thuy Dao
*Assistant Examiner* — Ziaul A Chowdhury
(74) *Attorney, Agent, or Firm* — Tony Azure; Andrew Sanders; Micky Minhas

(57) ABSTRACT

A user experience ("UX") customization framework is provided that enables the customization of the UX provided by an operating system ("OS") and application programs executing on the OS. The UX customization framework includes a UX platform engine that processes UX markup language files to create a customized UX. UX markup language files include data that is formatted according to a UX markup language. The UX markup language is a superset of the hypertext markup language that defines additional markup language tags for use in creating a customized UX, such as tags through which the functionality provided by an OS component or an application program that is exposed through an application programming interface may be utilized within the UX.

19 Claims, 6 Drawing Sheets

(56) References Cited

U.S. PATENT DOCUMENTS

| | | |
|---|---|---|
| 2003/0018661 A1* | 1/2003 | Darugar .................... 707/500 |
| 2003/0176997 A1 | 9/2003 | Wajda |
| 2003/0182395 A1* | 9/2003 | Lynch et al. ................ 709/218 |
| 2004/0034833 A1* | 2/2004 | Kougiouris et al. .......... 715/513 |
| 2004/0109024 A1* | 6/2004 | Hori et al. .................... 345/762 |
| 2004/0210819 A1 | 10/2004 | Alonso |
| 2004/0218451 A1 | 11/2004 | Said et al. |
| 2004/0268360 A1* | 12/2004 | Atkin et al. .................. 719/310 |
| 2005/0114494 A1* | 5/2005 | Beck et al. ................... 709/224 |
| 2005/0132278 A1* | 6/2005 | Yoshida ....................... 715/513 |
| 2005/0154978 A1* | 7/2005 | Albornoz et al. ............. 715/513 |
| 2005/0172261 A1* | 8/2005 | Yuknewicz et al. ........... 717/106 |
| 2005/0193291 A1* | 9/2005 | Subramanian et al. ....... 714/710 |
| 2005/0219201 A1 | 10/2005 | Watling |
| 2006/0101397 A1* | 5/2006 | Mercer et al. ................ 717/120 |
| 2006/0130047 A1* | 6/2006 | Burugapalli .................. 717/170 |
| 2006/0139312 A1 | 6/2006 | Sinclair, II et al. |
| 2006/0177012 A1* | 8/2006 | Forney et al. ................ 379/67.1 |
| 2006/0242124 A1* | 10/2006 | Fields et al. ...................... 707/3 |
| 2007/0061779 A1* | 3/2007 | Dowedeit et al. ............. 717/120 |
| 2008/0065978 A1* | 3/2008 | Francker et al. .............. 715/223 |
| 2010/0125829 A1* | 5/2010 | Lee et al. ...................... 717/116 |

OTHER PUBLICATIONS

Todd D. Hodes et al., "A Document-Based Framework for Internet Application Control", [Online], 1999, pp. 1-13, [Retrieved from Internet on Dec. 19, 2013], <http://static.usenix.org/events/usits99/full_papers/hodes/hodes.pdf>.*

Todd Hodes et al., "Entity Description and User Interface Generation for a Heterogeneous Component-based Distributed System", [Online], 1998, pp. 1-8, [Retrieved from Internet on Dec. 19, 2013], <http://www.eecs.berkeley.edu/Pubs/TechRpts/1998/CSD-98/1008.pdf>.*

P.N. Nicholl et al., "An XML approach for legacy code reuse", [Online], 2002, pp. 77-89, [Retrieved from Internet on Dec. 19, 2013], <http://ac.els-cdn.com/S0164121201001042/1-s2.0-S0164121201001042-main.pdf>.*

"Web Content Accessibility Guidelines 1.0", Date: May 5, 1999, http://www.w3.org/TR/WAI-WEBCONTENT/.

Fink, et al., "Adaptable and Adaptive Information Access for All Users, Including the Disabled and the Elderly", Date: 1997, http://www.ics.uci.edu/~kobsa/papers/1997-UM97-kobsa.pdf.

* cited by examiner

USER EXPERIENCE CUSTOMIZATION FRAMEWORK

BACKGROUND

Computer user interfaces have evolved over time from complex command line interfaces to the user-friendly graphical user interfaces ("GUIs") that are common on desktop computers today. While computer user interfaces have generally become more easy to use over time, certain classes of computer users still have difficulty with even the friendliest of GUIs. For instance, people generally uncomfortable with technology or that are new to computers may find some modern GUIs difficult to use. Likewise, young children, older people, or persons with cognitive disabilities may find the user experience ("UX") provided by modern GUIs difficult to understand and to interact with. UX refers to the visual and audio aspects of a user interface along with the manner in which a user interacts with the user interface.

Most modern GUIs provide features that allow a user to customize aspects of the UX. For instance, a GUI may provide themes that can be applied to change the visual appearance of the GUI. These types of customizations, however, are generally limited to customizing the stylistic aspects of user interface ("UI") windows and other UI objects. Some operating systems also provide accessibility features that allow the UX to be customized for users with physical disabilities, such as users with poor eyesight or poor hand-eye coordination. As an example, a user may be permitted to select a high contrast color scheme or to magnify portions of the GUI for improved readability. A user may be similarly permitted to modify the manner in which a user interface device operates in order to improve usability in view of a particular physical disability.

In this manner, the customization and accessibility features provided by some operating systems allow the UX to be customized to a degree for a particular user. In the event that additional customization of the UX is needed for a particular user, however, it is almost always necessary to create custom program code. For instance, even with the use of accessibility features, people with certain types of cognitive disabilities may be confused by the UX provided by current GUIs. Through the use of a simplified UI customized to the needs of the particular user, however, these types of people can often effectively utilize a computer. Provision of a simplified GUI that is customized for the needs of a particular user, however, generally requires the creation of a custom program for providing the GUI. Unfortunately, the programming of a simplified GUI that is customized to the needs of a particular user can be difficult, time consuming, and expensive. Furthermore, after such program code has been developed, it needs to be supported through its life cycle with bug fixes. This custom application will then have to be redone, once a new version of the underlying operating system or application ships. The effort required to create the new GUIs is multiplied by the fact that different target audiences require different customized GUIs.

It is with respect to these considerations and others that the disclosure made herein is provided.

SUMMARY

Technologies are described herein for creating a customized UX. Through aspects presented herein, a custom GUI can be created that provides a UX that is tailored to the needs of a particular computer user without performing any programming. Instead, the UX is defined through the creation and use of one or more declarative UX markup language files. The UX defined by the declarative UX markup language files is rendered by a UX customization framework to provide the customized UX.

According to one aspect presented herein, a UX customization framework is provided that enables the customization of the UX provided by an operating system ("OS") and application programs executing on the OS. Through the use of the UX customization framework, the UI provided by a computing system is separated from the functionality provided by the underlying OS and the application programs executing on the computing system. By separating the UI from the functionality provided by the OS and the application programs, a UX may be created that is customized to the particular needs of any user. For instance, a highly simplified UI may be easily created for sending electronic mail ("e-mail") messages that utilizes the existing functionality exposed by an e-mail client application for constructing and sending e-mail messages. As will be described in greater detail below, such a UX may be defined without performing any programming whatsoever.

According to another aspect presented herein, a UX customization framework is disclosed that includes a UX platform engine. The UX platform engine processes UX markup language files to create a customized UX. The UX markup language files include data that is formatted according to a UX markup language described herein. The UX markup language is a superset of the hypertext markup language ("HTML"). As such, the UX markup language may be utilized to define pages that include text, graphics, audio, forms, buttons, and other UI objects typically found in HTML pages. These UI objects form the basis for the visual and audible aspects of a customized UX.

The UX markup language also defines additional markup language tags and attributes for use in creating a customized UX. For instance, in one implementation, the UX markup language defines a tag through which the functionality provided by an OS component or an application program that is exposed through an application programming interface ("API") may be utilized within the UX. As an example, such tags may be utilized to access functionality provided by OS components or application programs through accessibility APIs, automation APIs, or application-specific APIs such as the messaging application programming interface ("MAPI") APIs. Functionality provided through other types of APIs may also be utilized through the use of such markup language tags.

In order to generate a customized UX utilizing the framework described herein, a user may use a visual designer application program or other type of editor to create the UX markup language files that describe the customized UX. The UX markup language files are then processed by the UX platform engine to render the customized UX. When markup language tags are encountered that reference functionality provided through an API exposed by an OS component or an application program, the UX platform engine calls the appropriate API on the referenced OS component or application. In this manner, a highly customized UI can be provided by creating UX markup language pages that utilize the functionality provided by existing OS components and application programs.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
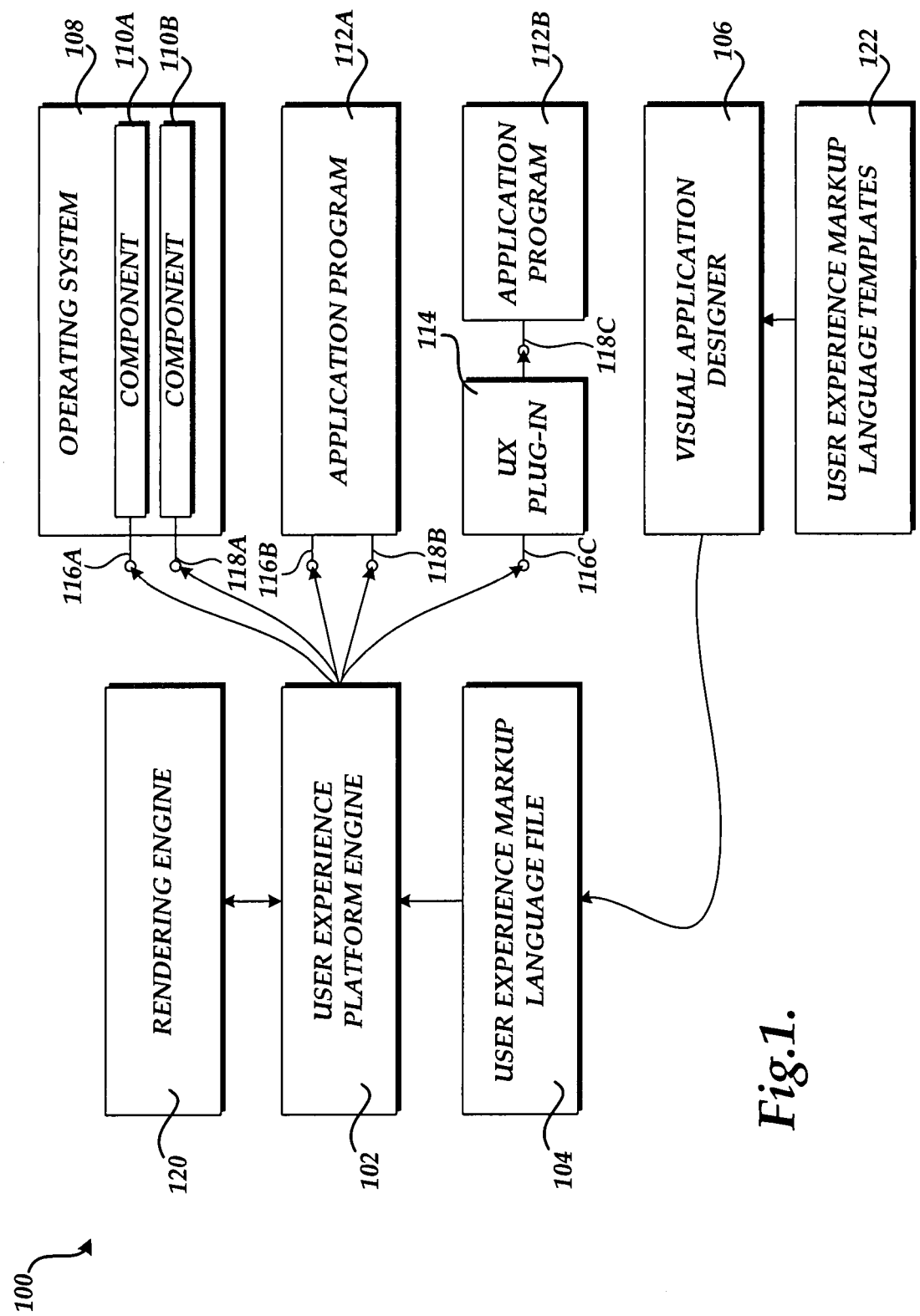
FIG. 1 is a software architecture diagram showing an illustrative software architecture for providing a customized UX in one implementation described herein.

The following detailed description is directed to technologies for enabling the creation of a UX that is customized for the needs of an individual user through the use of a UX customization framework. As will be discussed in greater detail below, in order to create a customized UX, only UX markup language files that describe the customized UX need to be created. The UX markup language files are rendered by a UX platform engine to provide the customized UX.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing a customized UX through the use of a UX customization framework will be described. In particular, FIG. 1 is a software architecture diagram showing an illustrative software architecture 100 in which a UX customization framework is embodied in one implementation described herein.

As shown in FIG. 1, one embodiment of the UX customization framework described herein includes a UX platform engine 102. As will be described in greater detail below, the UX platform engine 102 utilizes the contents of one or more UX markup language files 104 to generate a UX that is customized to the needs of a particular user. In this regard, the UX platform engine 102 may utilize a rendering engine 120 to actually render the contents of the UX markup language files 104. The rendering engine 120 may comprise any type of rendering engine capable of rendering an HTML file. Other types of rendering engines may also be utilized.

The UX markup language files 104 comprise one or more data files that include UX markup language. UX markup language is a superset of HTML that defines additional markup language tags for accessing the functionality provided by OS components and application programs through their public APIs. For instance, according to one implementation, the UX markup language defines a markup language tag through which functionality exposed by an OS component or an application program through an external API can be utilized. For instance, the OS 108 may include any number of components 110A-110B that expose functionality for use by the OS 108 or an application program through the APIs 116 and/or 118, respectively.

According to various embodiments, virtually any type of API may be utilized by the UX platform engine 102. For instance, in one implementation, automation APIs, such as the APIs 116A-116C, may be referenced by the UX markup language file 104 and utilized to access functionality provided by an OS component 110 or an application program 112. The automation APIs 116A-116C allow aspects of the operation of a program to be controlled by other programs. According to other implementations, accessibility APIs may be utilized, such as the APIs 118A-118B. The accessibility APIs 118A-118B provide a mechanism for exchanging information between applications and assistive technologies. As an example, the MICROSOFT® ASSISTANCE API™ ("MSAA") from MICROSOFT® CORPORATION of Redmond, Wash., allows applications to expose screen readers to the type, name, location, and current state of all objects and notifies screen readers of events that lead to a UI change.

According to other implementations, the APIs utilized by the UX platform engine 102 may include application-specific APIs that are specifically exposed by application programs 112 to directly expose their functionality ("application-specific APIs"). For instance, some e-mail application programs expose a MAPI API through which functionality for creating and sending e-mail messages is exposed. Other types of application-specific APIs include APIs exposed by World Wide Web ("Web") browsers for retrieving and rendering Web pages. It should be appreciated that the implementations described herein may be utilized with any application-specific API exposed by an OS component or an application program that provides access to functionality provided by the OS component or application program.

According to embodiments, a UX plug-in 114 may be utilized to provide an interface to functionality provided by programs that do not provide an API that is compatible with or recognizable by the UX platform engine 102. In such a scenario, the UX plug-in 114 may expose an API 116C compatible with the UX platform engine 102. The UX plug-in 114, in turn, calls the API 118C exposed by the application program 112B to access the desired functionality. Through the use of a UX plug-in 114 in this manner, functionality exposed by an application program through virtually any type of API may be utilized within a customized UX.

In order to create the UX markup language files 104, a user may utilize any type of text editing program or HTML editor. Alternatively, in embodiments, the UX customization framework described herein may include a visual application designer program 106 to assist with the creation of the UX markup language files 104. UX markup language templates 122 may also be provided for use with the visual application designer program 106. The UX markup language templates 122 provide a starting point for creating a new UX markup language file 104, including UX markup language for implementing common tasks. The visual application designer program 106 may also include a "wizard" for assisting a user with the creation of a new UX markup language file 104, including the generation of UX markup language for a desired group of common tasks (e.g. sending e-mail, Web browsing, etc.).

Referring now to FIGS. 1 and 2A-2E, an illustrative UI generated by the UX customization framework shown in FIG. 1 will be described. In particular, FIGS. 2A-2E show one example of a customized UX that could be easily generated and instantiated by the UX customization framework described herein. The UI shown in FIGS. 2A-2E consists of five screens 202A-202E, shown in FIGS. 2A-2E, respectively. The screens 202A-202E are generated by the UX platform engine 102 and the rendering engine 120 based upon the contents of one or more UX markup language files 104 and supporting files containing the graphical images shown in FIGS. 2A-2E. It should be appreciated that the UI shown in FIGS. 2A-2E is merely illustrative and that virtually any type of UI for providing any type of UX may be created in the manner described herein. The possibility of creating virtually any type of UI is of utmost importance in this case, as different target audiences have different needs. While some users might be helped by using the step-by-step approach as shown here in FIGS. 2A-2E, others might need to have all needed input on one screen, as they do not have a good concept of "previous" and "next".

The UI shown in FIGS. 2A-2E is a simplified UI for sending an e-mail message with an attached picture. Such a UI may be helpful, for instance, to a user with a cognitive disability for which the use of a traditional e-mail client may be difficult or even impossible. The UI shown in FIGS. 2A-2E begins with the screen 202A shown in FIG. 2A. The screen 202A includes text that describes its functionality and several graphical images that may be selected by the user to initiate further action. For instance, the button 206A may be selected by a user to end the process of sending an e-mail message. The images 204A-204B may be selected by the user to thereby choose the individual to whom the e-mail message should be sent.

It should be appreciated that standard HTML may be utilized to create the visual aspects of the screen 202A. However, in order to enable the functionality for sending an e-mail message, extended markup tags provided by the UX markup language provided herein must be utilized. For instance, a tag may be utilized in response to the selection of one of the images 204A-204B to instruct an e-mail application program to create a new e-mail message to the identified recipient (e.g. <A HREF="cape://e-mail.application.new.email"></A>). When the UX platform engine 102 encounters a tag that references the functionality provided by an OS component or application program through an API, the platform engine 102 calls the referenced API to perform the desired functionality. In this example, the UX platform engine 102 would call an API exposed by the e-mail client application for creating a new e-mail message. In the example UI shown in FIG. 2A, a user has selected the image 204A to begin the creation of a new e-mail message to the contact named "Joe." In response to the selection, the screen 202B, shown in FIG. 2B, is rendered and displayed.

Figure 2A:
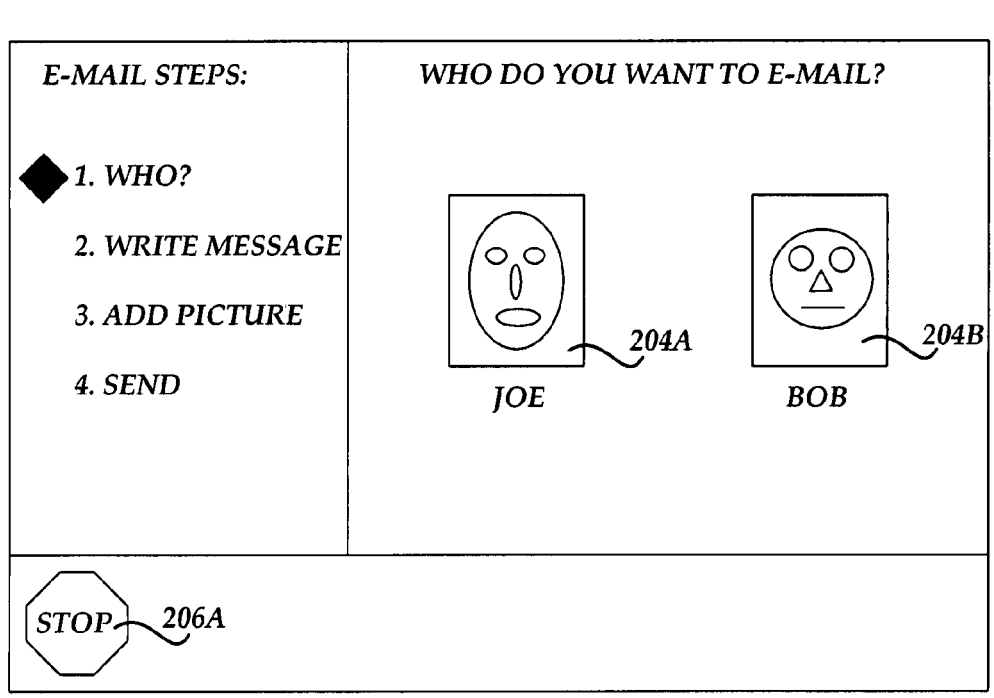
FIGS. 2A-2E are user interface diagrams showing one illustrative user interface provided by a UX customization framework described herein.
Figure 2B:
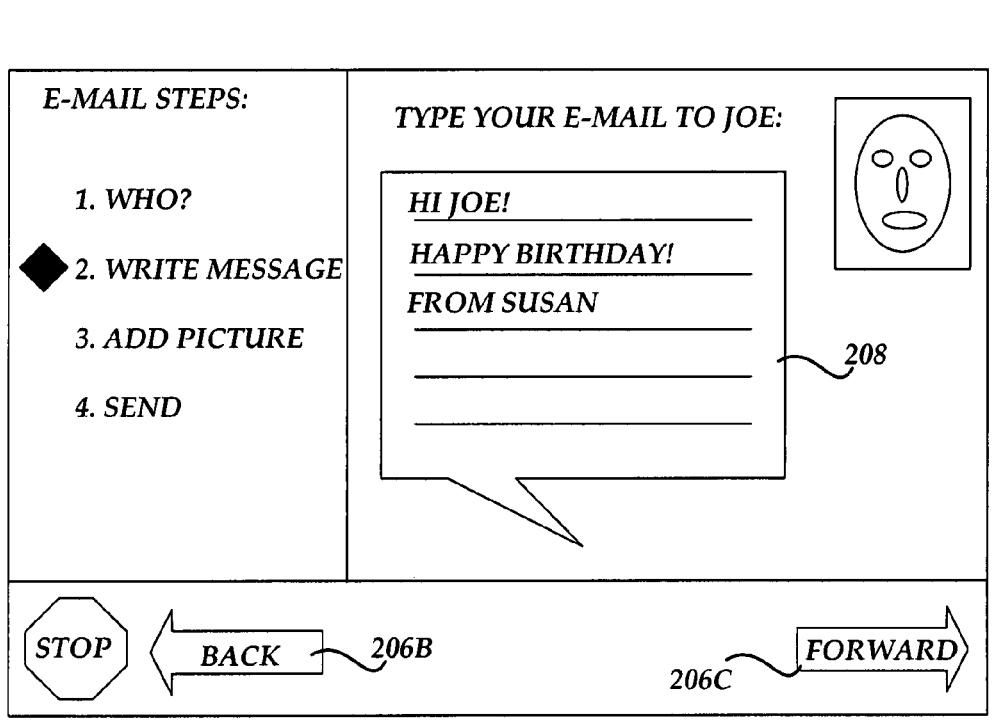
Figure 2C:
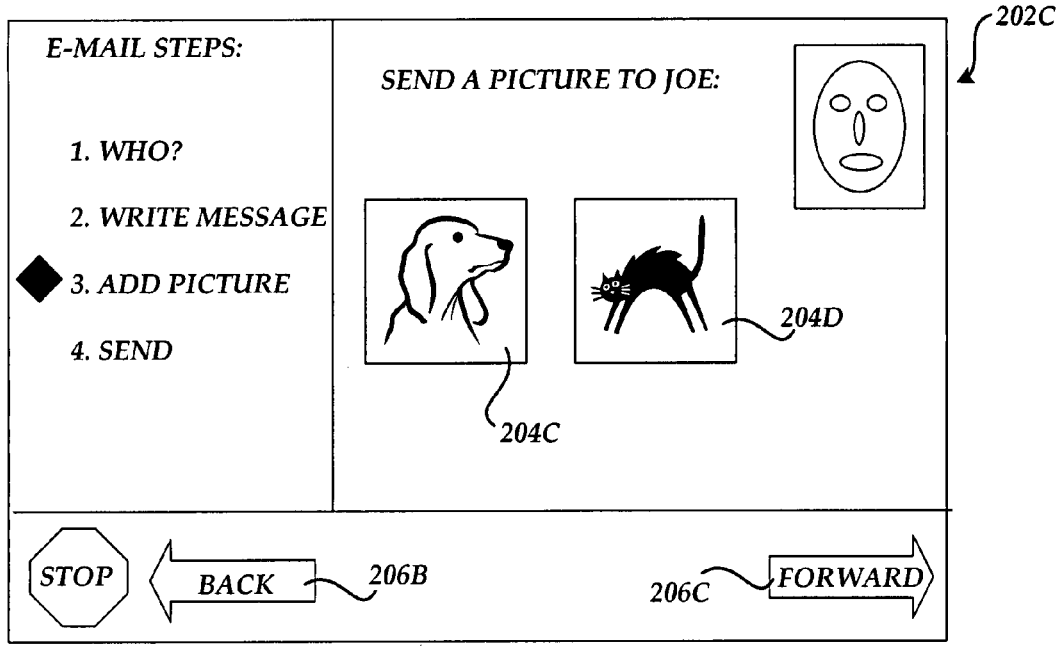

The screen 202B, shown in FIG. 2B, includes additional UI elements for creating the contents of the new e-mail message. As with the screen 202A, these elements may be generated using standard HTML. For instance, a form 208 is presented in which the user may type the contents of the new e-mail. In response to the selection of the button 206C, the e-mail application may be instructed to insert the text typed into the form 208 into the body of the new e-mail message. This activity may be tied to the action attribute of the form 208. Once this occurs, the screen 202C, shown in FIG. 2C, is displayed. The user may return to the screen 202A, shown in FIG. 2A, by selecting the button 206B.

Figure 2D:
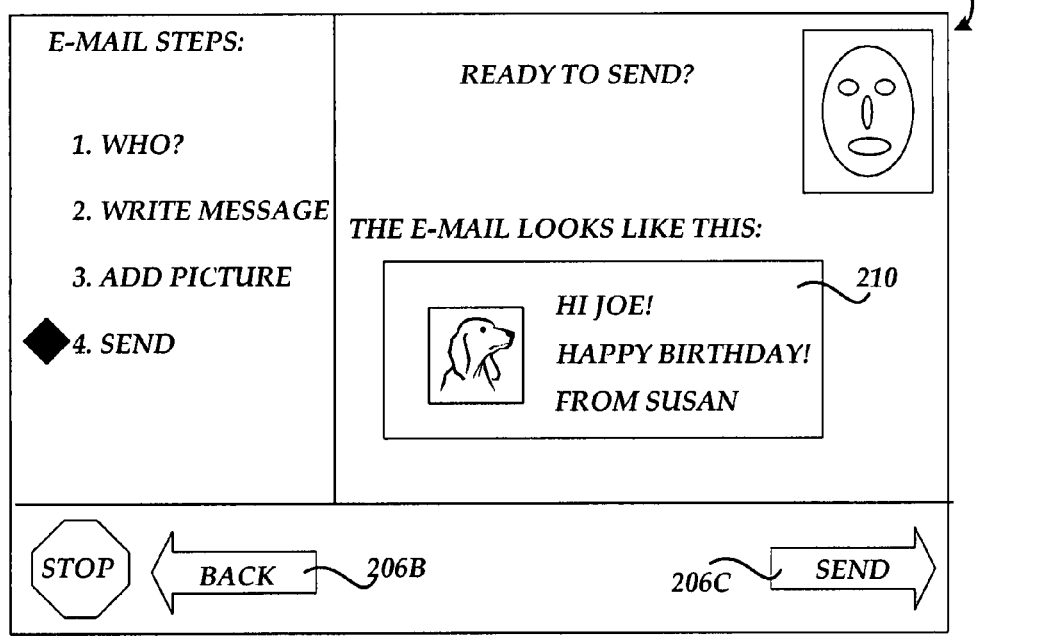

The screen 202C shown in FIG. 2C allows the user to attach an image to the e-mail being created. In this regard, the available images such as the images 204C-204D may be displayed to the user. In response to the selection of one of the images, the UX platform engine 102 may utilize the API exposed by the e-mail client application to instruct the application to attach the selected image to the new e-mail message. In the example shown in FIGS. 2A-2E, the user has selected the image 204C. In response to such a selection, the screen 202D shown in FIG. 2D is displayed. The buttons 206B and 206C may also be utilized to return to the screen 202B or to advance to the screen 202D, respectively.

The screen 202D shown in FIG. 2D provides a confirmation to the user of the content and attachments to the new e-mail message. In this manner, the screen 202D provides a visual indication 210 of what the new e-mail message will look like. As with the previously described screens, the visual aspects of the screen 202D may be created using standard HTML. If the user chooses the button 206C to send the new e-mail message, the UX platform engine 102 will call the appropriate API on the e-mail client application for sending the e-mail message. The screen 202E, described below, will then be displayed. The user may also select the button 206B to return to the screen 202C, described above with respect to FIG. 2C.

Figure 2E:
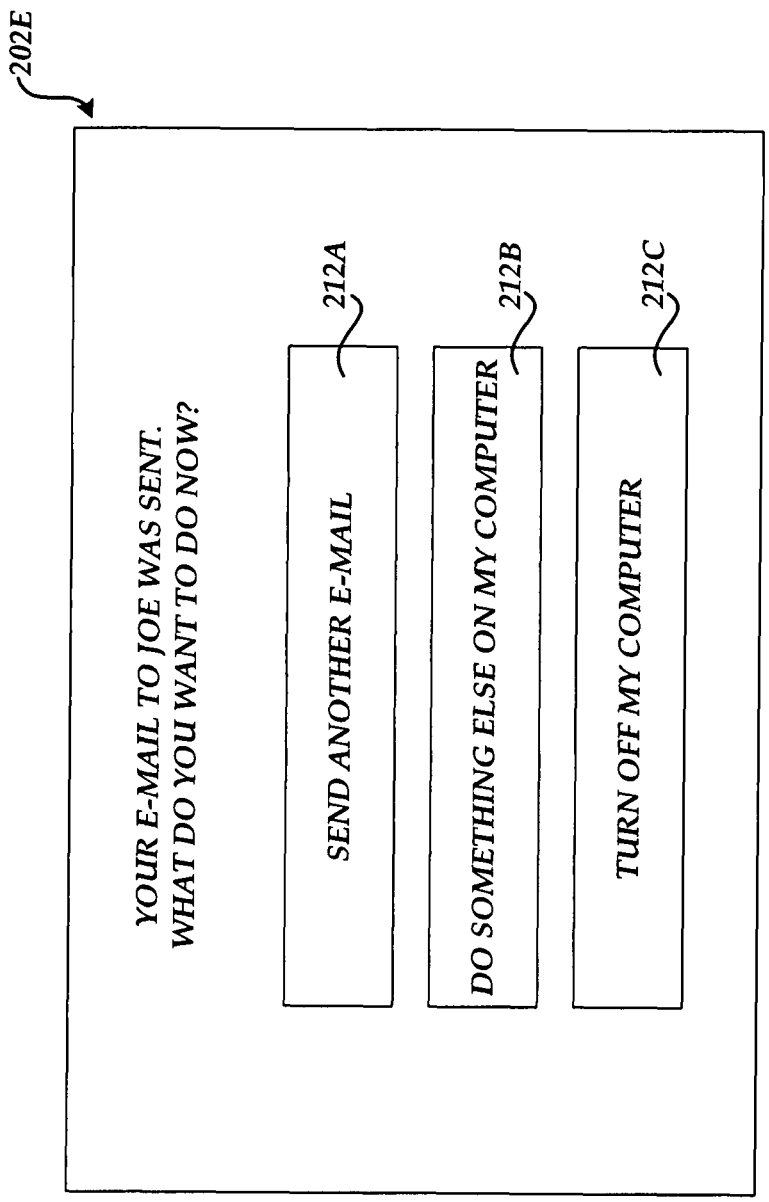

The screen 202E shown in FIG. 2E provides buttons 212A-212C corresponding to additional actions that may be taken by a user after their e-mail message has been sent. In particular, selection of the button 212A will cause the process described above for sending an e-mail message to be repeated. Selection of the button 212B will initiate a process for performing another task on the computer. For example, a similarly simplified UI could be created that allows a user to browse a limited list of Web sites. APIs exposed by a Web browser application program for retrieving and rendering Web pages may be called by the UX platform engine 102 to provide such a UX. Selection of the button 212C will cause the computer to be turned off. In this regard, the button 212C may be tied to an API exposed by an OS component for shutting down the computer system. Other types of functionality may be similarly encapsulated into a customized UX.

Figure 3:
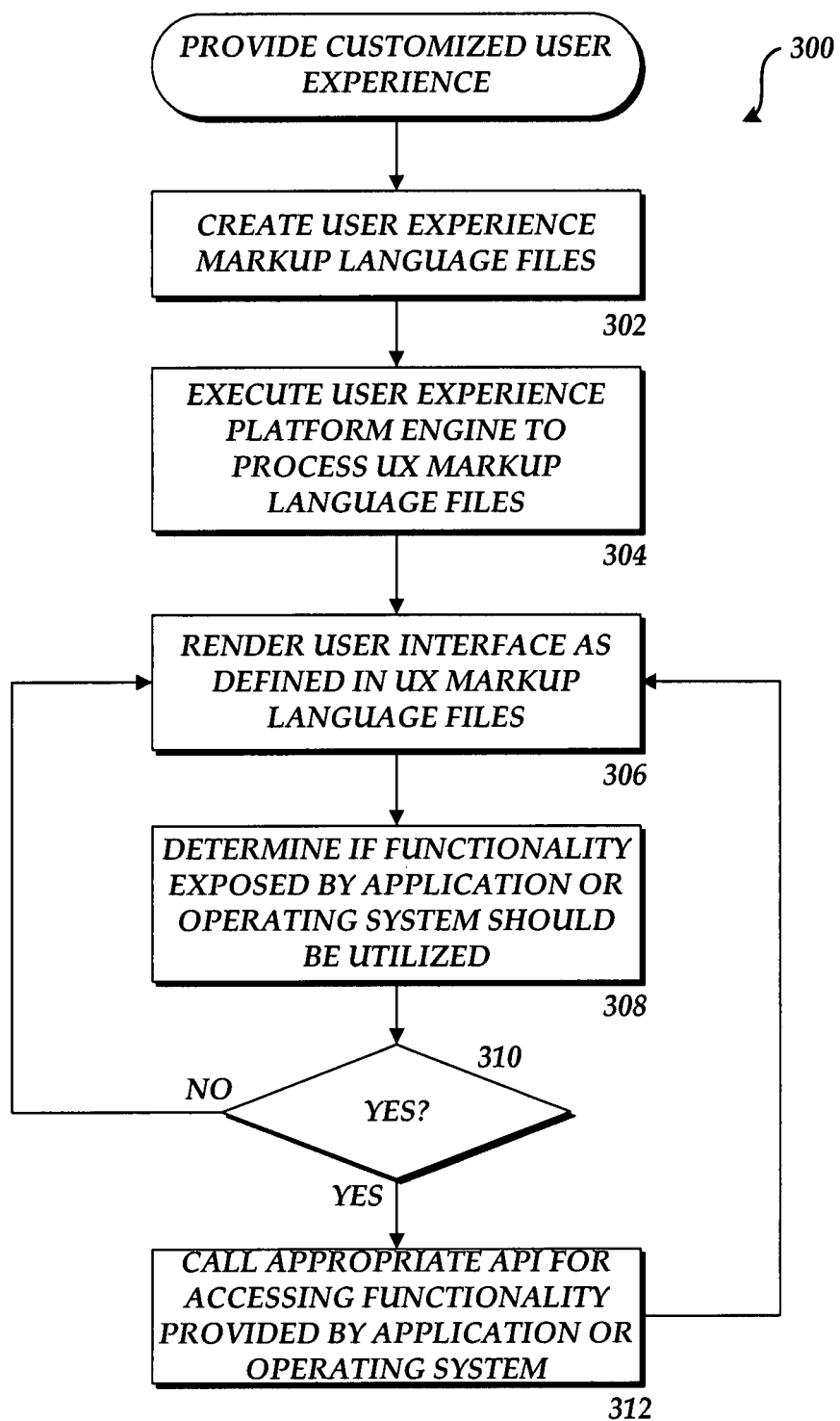
FIG. 3 is a flow diagram showing an illustrative process for providing a customized UX in one embodiment provided herein.

Referring now to FIG. 3, additional details will be provided regarding the embodiments presented herein for enabling the creation of a customized UX. In particular, FIG. 3 is a flow diagram showing a routine 300 that illustrates the operation of a computer 400, described below, for enabling the creation of a customized UX through the use of a UX customization framework.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination. It should also be appreciated that more or fewer operations may be performed than shown in FIG. 3 and described herein. These operations may also be performed in a different order than those described herein with respect to FIG. 3.

The routine 300 begins at operation 302, where one or more UX markup language files 104 are created. As discussed above, the visual application designer program 106 or another type of editor may be utilized to create the UX markup language files 104. Once the UX markup language files 104 have been created, the routine 300 proceeds to operation 304. At operation 304, the UX platform engine 102 is executed to process the UX markup language files 104. As discussed above, the UX platform engine 102 may utilize a rendering engine 120 to render the contents of the UX markup language files 104 to provide a visual UI to a user. This occurs at operation 306.

From operation 306, the routine 300 continues to operation 308, where the UX platform engine 102 determines whether the UX markup language files 104 include tags that reference functionality exposed by an OS component or an application program through an API. If not, the routine 300 returns to operation 306, described above. If so, the routine 300 proceeds from operation 310 to operation 312, where the UX platform engine 102 calls the appropriate API on the referenced OS component or application program. As discussed above, this may occur in response to the selection of a UI object or may occur in-line with the rendering of the UX markup language file 104. From operation 312, the routine 300 returns to operation 306, described above.

Figure 4:
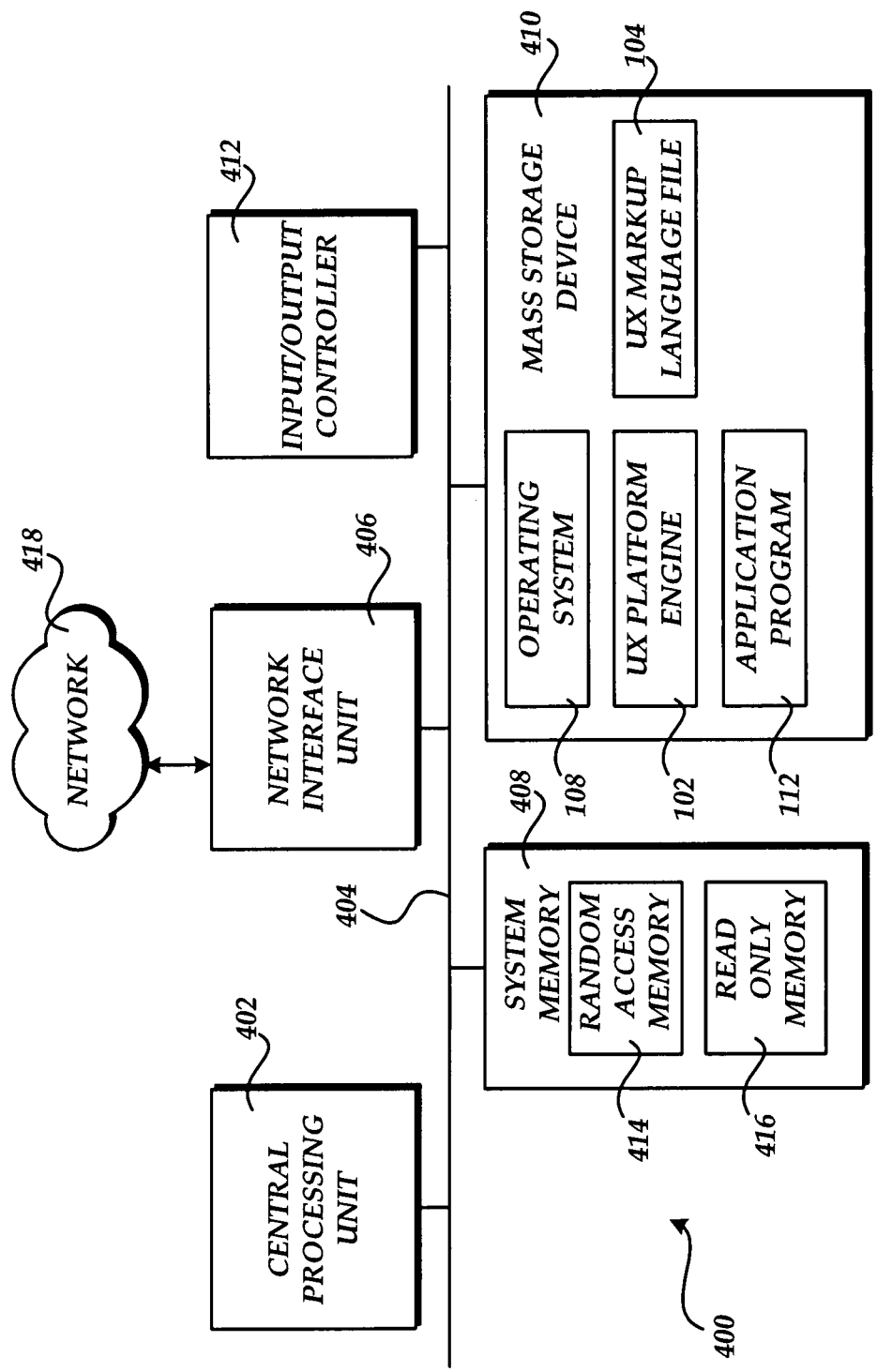
FIG. 4 is a computer architecture diagram showing a computer architecture suitable for implementing a computer system capable of providing a customized UX according to one implementation described herein.

Referring now to FIG. 4, an illustrative computer architecture for a computing system 400 capable of executing the software components described above with respect to FIG. 1 will be discussed. The computer architecture shown in FIG. 4 illustrates a conventional desktop, laptop computer, or server computer. The computer architecture shown in FIG. 4 includes a central processing unit 402 ("CPU"), a system memory 408, including a random access memory 414 ("RAM") and a read-only memory ("ROM") 416, and a system bus 404 that couples the memory to the CPU 402. A basic input/output system containing the basic routines that help to transfer information between elements within the computer 400, such as during startup, is stored in the ROM 416. The computer 400 further includes a mass storage device 410 for storing an operating system 320, application programs, and other program modules, which will be described in greater detail below.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network 418, such as the Internet. The computer 400 may connect to the network 418 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including an operating system suitable for controlling the operation of a networked desktop, laptop, or server computer. The mass storage device 410 and RAM 414 may also store one or more program modules. In particular, the mass storage device 410 and the RAM 414 may store the a UX platform engine 102, an application program 112, a UX markup language file 104, and the other program modules shown in and described above with reference to FIG. 1. Other program modules may also be stored in the mass storage device 410 and utilized by the computer 400.

Based on the foregoing, it should be appreciated that technologies for enabling the creation of a customized UX are provided herein. As described herein, a UX customization framework may be utilized to disassociate the UI of OS components and application programs from the functionality they provide. It should be appreciated, however, that aspects of the UI generated by an OS component or an application program may be display to a user as a part of a customized UX. It should also be appreciated that the components described herein as comprising the UX customization platform are merely illustrative and that more or fewer components may be utilized. It should further be appreciated that, through the use of the technologies described herein, a user may specify their desired input and output modes. For instance, through the embodiments described herein, input and output functionality provided by operating system components or application programs may be utilized. As an example, multiple input modes such as speech, alternative input devices, mouse, keyboard, and pointed devices may be specified and utilized. Similarly, multiple output modes may also be specified such as speech, text, images, sign language, Braille, or the like.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method that provides a customized user experience for a computing system, the method comprising:
    storing a user experience markup language file, the user experience markup language file comprising one or more markup tags that generate a user interface comprising one or more user interface objects, and one or more markup tags referencing an application programming interface (API) that accesses functionality exposed by a computer program; and
    executing a user experience platform engine on the computing system that processes the user experience markup language file to render the one or more user interface objects, the user experience platform engine operative to determine that the user experience markup language file has at least one markup tag of the one or more markup tags contained therein referencing the API that accesses functionality exposed by the computer program, and in response thereto, to call the API to utilize the functionality exposed through the API by way of the user interface.

2. The computer-implemented method of claim 1, wherein the computer program comprises an operating system component or an application program.

3. The computer-implemented method of claim 2, wherein the API comprises an accessibility API.

4. The computer-implemented method of claim 2, wherein the API comprises an automation API.

5. The computer-implemented method of claim 2, wherein the API comprises an application-specific API.

6. The computer-implemented method of claim 5, wherein the application-specific API comprises a messaging application programming interface API.

7. The computer-implemented method of claim 2, wherein the computer program is stored at the computing system.

8. The computer-implemented method of claim 2, wherein the computer program is stored at a second computing system.

9. A computer-implemented method that provides a customized user experience for a computing system, the method comprising:
    receiving a markup language file comprising one or more markup tags that generates a user interface comprising one or more user interface objects and one or more markup tags for accessing a function exposed by a computer program through an application programming interface (API);
    rendering the markup language file to provide the user interface;
    determining whether the markup language file has at least one markup language tag stored therein that references a function to be exposed by a computer program through the API; and
    in response to determining that the markup language file has the at least one markup language tag stored therein that references the function exposed through the API, calling the API to execute the function provided by the computer program by way of the user interface.

10. The computer-implemented method of claim 9, wherein the computer program comprises an operating system component.

11. The computer-implemented method of claim 9, wherein the computer program comprises an application program.

12. The computer-implemented method of claim 9, wherein the API comprises an accessibility API.

13. The computer-implemented method of claim 9, wherein the API comprises an automation API.

14. The computer-implemented method of claim 9, wherein the API comprises an application- specific API.

15. One of an optical storage disk, a magnetic storage device or a solid state memory having computer-executable instructions stored thereon which, when executed by a computer, cause the computer to:
    store a user experience markup language file, the user experience markup language file comprising one or more markup tags;
    generate a user interface based on the one or more markup tags, the user interface comprising one or more user interface objects;
    accessing functionality exposed through an application programming interface (API) of a computer program based on the one or more markup tags and by way of the one or more user interface objects; and
    execute a user experience platform engine on the computing system that processes the user experience markup language file to render the one or more user interface objects, the user experience platform engine operative to determine that the user experience markup language file has at least one markup tag of the one or more markup tags contained therein referencing the API that accesses functionality exposed by the computer program, and in response thereto, to call the API to utilize the functionality exposed through the API by way of the user interface.

16. The optical storage disk, the magnetic storage device or the solid state memory of claim 15, wherein the API comprises an accessibility API.

17. The optical storage disk, the magnetic storage device or the solid state memory of claim 15, wherein the API comprises an automation API.

18. The optical storage disk, the magnetic storage device or the solid state memory of claim 15, wherein the API comprises an application-specific API.

19. The optical storage disk, the magnetic storage device or the solid state memory of claim 15, wherein the application-specific API comprises a messaging application programming interface (MAPI) API.

* * * * *